United States Patent
Nguyen et al.

(10) Patent No.: US 8,570,999 B1
(45) Date of Patent: Oct. 29, 2013

(54) SYSTEM AND METHOD FOR COMMUNICATIONS IN A NETWORK

(75) Inventors: Hung C. Nguyen, Milpitas, CA (US); John P. Tero, Saratoga, CA (US)

(73) Assignee: Greenvity Communications, Inc., Milpitas, CA (US)

( * ) Notice: Subject to any disclaimer, the term of this patent is extended or adjusted under 35 U.S.C. 154(b) by 51 days.

(21) Appl. No.: 13/337,146

(22) Filed: Dec. 25, 2011

Related U.S. Application Data

(60) Provisional application No. 61/434,422, filed on Jan. 19, 2011.

(51) Int. Cl.
*H04J 1/00* (2006.01)

(52) U.S. Cl.
USPC .......................................... 370/343

(58) Field of Classification Search
None
See application file for complete search history.

(56) References Cited

U.S. PATENT DOCUMENTS

| | | | |
|---|---|---|---|
| 2005/0265372 A1* | 12/2005 | Bae et al. | 370/431 |
| 2006/0146764 A1* | 7/2006 | Takemoto et al. | 370/338 |
| 2010/0023800 A1 | 1/2010 | Harari et al. | |
| 2010/0111199 A1 | 5/2010 | Sharma | |
| 2011/0035510 A1 | 2/2011 | Alexander | |
| 2011/0071695 A1* | 3/2011 | Kouroussis et al. | 700/295 |
| 2012/0223840 A1* | 9/2012 | Guymon et al. | 340/870.02 |

FOREIGN PATENT DOCUMENTS

CN 201230313 Y 4/2009

* cited by examiner

*Primary Examiner* — Raj Jain
(74) *Attorney, Agent, or Firm* — Perkins Coie LLP; Aaron Wininger

(57) ABSTRACT

A system connected to power lines in a network includes a wireless component; a wired component interfaced with the power lines; a conversion component coupled to the wireless component and the wired component and performs at least unidirectional conversion of a transmission unit between wireless and wired, the conversion employs only MAC addresses for addressing.

17 Claims, 12 Drawing Sheets

| Zigbee MAC addresses |
|---|
| $s_1$ |
| $m_1$ |
| $Z(t_1)$ |

*Fig. 10a*

| HPGP MAC addresses |
|---|
| $P(s_1)$ |
| $m_2$ |
| $t_1$ |

*Fig. 10b*

| Zigbee MAC addresses |
|---|
| $s_1$ |
| $m_1$ |
| $Z(t_1)$ |
| $s_2$ |
| $r_1$ |

*Fig. 10c*

| Corresponding HPGP MAC addresses |
|---|
| $P(s_2)$ |
| $m_2$ |
| $t_1$ |
| $P(s_2)$ |
| $r_2$ |

*Fig. 10d*

SYSTEM AND METHOD FOR COMMUNICATIONS IN A NETWORK

CROSS-REFERENCE TO RELATED APPLICATION(S)

The present application claims the benefit of and incorporates by reference U.S. provisional application No. 61/434,422, filed on Jan. 19, 2011.

TECHNICAL FIELD

The present application relates to merging wireless communications with wired communications in a network, and more particularly, but not exclusively, to a system and a method for communications in a home area network.

BACKGROUND OF THE INVENTION

A smart grid is a complex electricity network that covers electricity delivery and information exchange from energy suppliers to sub-stations, homes/buildings, and vice versa. A local area network (LAN), e.g., a home area network (HAN) connects or couples smart devices with a utility gateway (e.g., smart meter) or a service provider gateway (e.g., a router or a set-top box) and is quite important for the smart grid.

In a conventional local area network, electric vehicles, air conditioners, experimental facilities or any other smart devices can be built with either wireless or wired information communication technologies (also referred to as communication technology or ICT). In most cases, a wireless ICT and a wired ICT are not mutually compatible.

In some situations, wireless communications suffer intolerable attenuation of signal intensity caused by distances or impenetrable obstacles such as concrete walls. Relays have been attempted in the smart grid but are not really satisfactory because the relays themselves are also subject to the same attenuation. In addition, as the relays have to be awake most of the time and are usually powered by batteries, their battery life will be short.

For these and other reasons, a system and a method having at least one of the following features are desirable: (a) eliminate the need of transmission control protocol/internet protocol (TCP/IP) and still allow communications between smart devices built with non-interoperable ICTs; (b) extend effective range of the wireless communications.

BRIEF DESCRIPTION OF THE INVENTION

To this end, a hybrid solution is provided to merge a wireless network (e.g., a wireless local area network, WLAN) and a wired network (e.g., a wired local area network) into one single virtual network (SVN). In this single virtual network, power lines can be utilized as backbones to transport communications originated from or heading to a wireless device.

In an embodiment of the invention, communications between a wireless device and a wired device are converted (or translated) at a system connected to the power lines. In an embodiment, two wireless devices adopt non-interoperable ICTs, the communications can be translated at the system.

Direct communications between two wireless devices may be infeasible due to distances or obstacles. In an embodiment, wireless transmission units between the two wireless devices are relayed by the system wirelessly. Alternatively, the system may be configured to convert the wireless transmission units to wired transmission units which will be transported to another system. The another system then converts the transmission units back to wireless and forward the same to a destination.

Specifically, according to an embodiment of the invention, a system connected to power lines in a network comprises a wireless component; a wired component interfaced with the power lines; a conversion component coupled to the wireless component and the wired component and performs at least unidirectional conversion of a transmission unit between wireless and wired, wherein the conversion employs only MAC addresses for addressing.

In an embodiment of the invention, a system connected to power lines comprises a first component configured for communications in a first network; a second component configured for communications in a second network; an interface component coupled to the wireless and wired components and configured to interface the first component to the second component; wherein the first component is configured to determine if a device is joining the first network, wherein the interface component is configured to inform the second component of the determination from the first component, and wherein the second component is configured to, if a device is joining the first network, determine an address in the second network for the device and inform at least one device in the second network of a device with the determined address is joining the second network.

According to an embodiment of the invention, a method comprises receiving a transmission unit at a system connected to power lines in a network; detecting, by the system, addressing information of the transmission unit; in case the transmission unit belongs to communication between a wired device and a wireless device, converting the transmission unit by the system to comply with a destination of the transmission unit, wherein the conversion employs only MAC address for addressing; sending the converted transmission unit to the destination.

A method in a system coupled to power lines comprises determining if a device is joining a first network; if a device is joining the first network, determine an address in a second network for the device and inform at least one device in the second network of a device with the determined address is joining the second network.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 10*a*-10*d* are drawings illustrating address tables stored in a Zigbee-HPGP system according to an embodiment of the invention;

DETAILED DESCRIPTION

Various aspects and examples of the invention will now be described. The following description provides specific details for a thorough understanding and enabling description of these examples. In an alternative embodiment, the invention may be practiced without many of these details. Additionally, some well-know structures or functions may not be shown or described in detail to avoid obscuring the relevant description of the embodiments of the invention.

Terminologies presented in the specification including but not limited to the explained ones are intended to be interpreted in their broadest reasonable manner, even though they are used in conjunction with a detailed description of certain specific examples of the invention. Some terms may even be emphasized below, however, any terminology intended to be interpreted in any restricted manner will be overtly and specifically defined as such in this Detailed Description section.

In smart grid applications, IEEE 802.15.4 and Zigbee standards are top choices for wireless communications among the manufacturers for energy conservation. Meanwhile, Home-Plug Green PHY (HPGP) may be the main choice for power lines communications (PLC) in smart grid applications. Only for purpose of example, the description below focuses on Zigbee and HPGP standards. As will be appreciated, embodiments of the present invention are also applicable to other standards.

Figure 1:
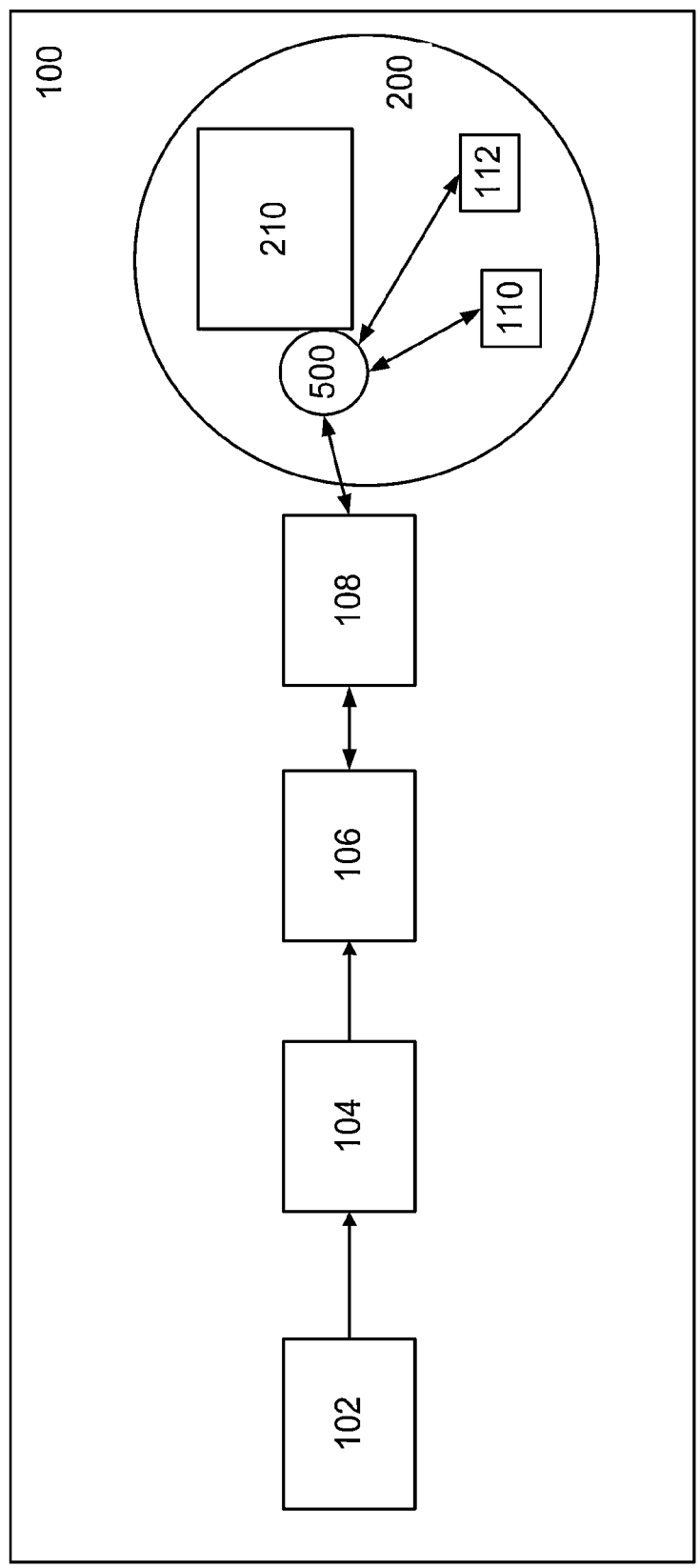
FIG. 1 is a drawing illustrating a smart grid.

FIG. 1 is a drawing illustrating a smart grid 100 overlaying electricity distributions and information transmission. Electricity is generated at a power station 102 and then distributed via transmission paths 104, substations 106 and local distributors 108 to local area networks. The smart grid 100 may includes thousands of local area networks though one single local area network 200 is shown for simplicity. Without loss of generality, applications of different aspects and embodiments of the invention in home area networks (HANs) will be described. The LAN 200 is also referred to as HAN 200.

To perform smart energy saving or management function, a smart meter 500 installed, for example, outside a house 210, is embedded with Zigbee or HPGP functions and controlled by a utility company. The smart meter 500 acts as a gateway that transfers energy related data from HAN 200 to the utility company and vice versa. Alternatively, the HAN 200 may exchange smart-grid related data with the utility company through a router, a switch, or any other home gateway embedded with Zigbee or HPGP functions. The home gateway transfers smart-grid related data from the HAN 200 to a network service provider (e.g., uploads the data to a public server) such that the data can be viewed or accessed via the Internet.

The HAN 200 may have residential generators such as a solar generator 110 or a wind driven generator 112 which can also perform one-way or two-way communications with the utility company via the smart meter 500 or a home gateway.

Figure 2:
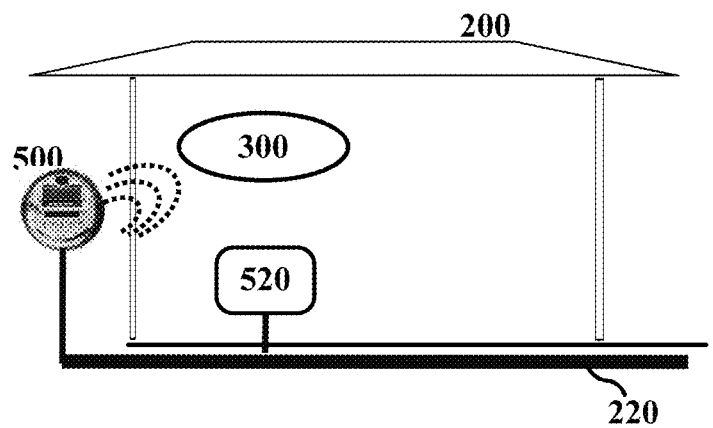
FIG. 2 is a drawing illustrating a home area network bridging Zigbee and HomePlug Green PHY (HPGP) by using a smart meter according to an embodiment of the invention.

FIG. 2 is a drawing illustrating the HAN 200 bridging Zigbee and HPGP with a smart meter 500 according to an embodiment of the invention. The HAN 200 may include any number of wireless devices though only one wireless device 300 is shown. The HAN 200 includes two wired devices, i.e. the smart meter 500 and a TV 520. In alternative embodiments, the HAN 200 may include additional wired devices. Power lines 220 are connected to the smart meter 500 and the TV 520 to supply electricity power and transport information as discussed below.

In this embodiment, the TV 520 can only receive or send HPGP-formatted packets (HPGP packets). Similarly, the wireless device 300, e.g., a sensor (hereinafter referred to as sensor 300), can only receive and send Zigbee-formatted packets. The smart meter 500 performs protocol translation functions to enable cross communications between the sensor 300 and the TV 520. In an embodiment, the cross communications employ only MAC addresses for addressing such that TCP/IP which requires additional hardware and software support is unnecessary.

Figure 3:
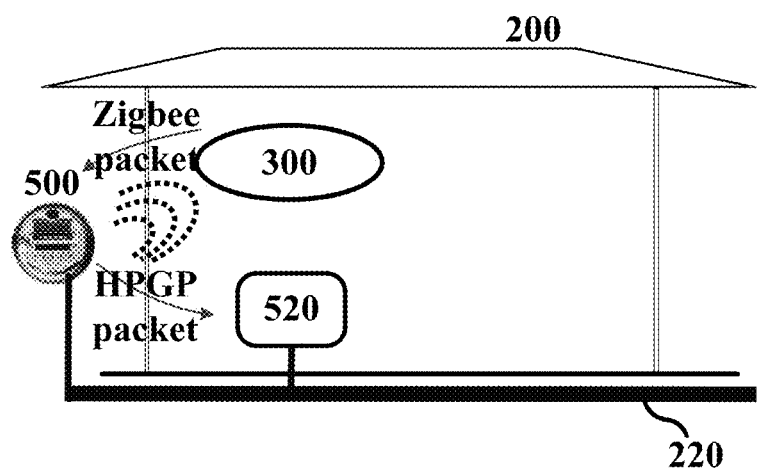
FIG. 3 is a drawing illustrating information transmission from a Zigbee device to a HPGP device according to an embodiment of the invention.

FIG. 3 is a drawing illustrating information transmission from a Zigbee device to a HPGP device according to an embodiment of the invention. Information is generated at the sensor 300 and needs to be sent to the TV 520. By way of example, the information may describe luminance in the house captured by the sensor 300 for flexibly adjusting display brightness at the TV 520 for eye strain or energy savings. For transmission, in the sensor 300, the information (data) is encapsulated in a Zigbee packet (a wireless transmission unit), which means the preamble, MAC header, modulation and encoding in physical layer are based on the Zigbee standard. The sensor 300 then transmits the Zigbee packet wirelessly. The smart meter 500 receives and converts the Zigbee packet to a HPGP packet (a wired transmission unit) which is then forwarded to the TV 520 via the power lines 220. The TV 520 receives and processes the HPGP packet based on the HPGP standard.

Figure 4:
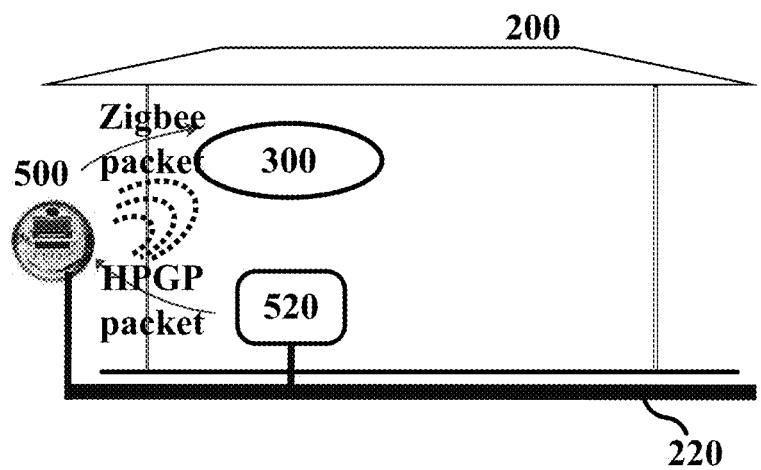
FIG. 4 is a drawing illustrating information transmission from a HPGP device to a Zigbee device according to an embodiment of the invention.

FIG. 4 is a drawing illustrating information transmission from a HPGP device to a Zigbee device according to an embodiment of the invention. Referring to FIG. 4, the TV 520 may need to send information to the sensor 300, e.g., to query the luminance in the house. The information is encapsulated in a HPGP packet which is then sent through the power lines 220. In an embodiment, the generated HPGP packet may be sent to a multicast address (the smart meter 500 is a member of a group indicated by the multicast address) or broadcasted to such that the HPGP packet can get to a right destination, e.g., the smart meter 500, via the power lines 220. The smart meter 500 receives and converts the HPGP packet to a Zigbee packet and then forwards the Zigbee packet to the sensor 300 wirelessly. Note that TV 520 does not necessarily need to send packets to 500 (via powerline) in multicast or broadcast modes. Over the powerline, which is a shared medium, all powerline devices including smart meter 500 can receive the packet sent by TV 520. Similarly, for wireless, which is a shared medium, all Zigbee wireless can receive packets sent by the sensor 300 as long as the range (distance between them) are reasonable.]

After an overview of various aspects of the invention, description of the smart meter 500 is provided below. In alternative embodiments, translation between different standards, relay from a wireless device to another or a combination thereof may be performed by a home gateway, or any other wired device such as a TV, a washing machine, a microwave oven, etc configured appropriately.

Figure 5:
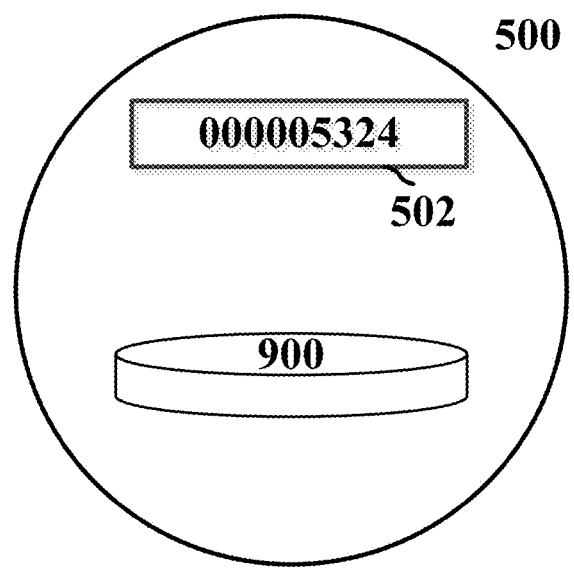
FIG. 5 is a schematic drawing illustrating a smart meter according to an embodiment of the invention.

FIG. 5 is a drawing illustrating a smart meter 500 according to an embodiment of the invention. The smart meter 500 includes a readout window 502 and a hybrid chip 900 to carry out different types of communications as discussed below. In an embodiment of the invention, the smart meter 500 may include another component or components besides the readout window 502 and the hybrid chip 900 to enable certain embodiments.

Figure 6:
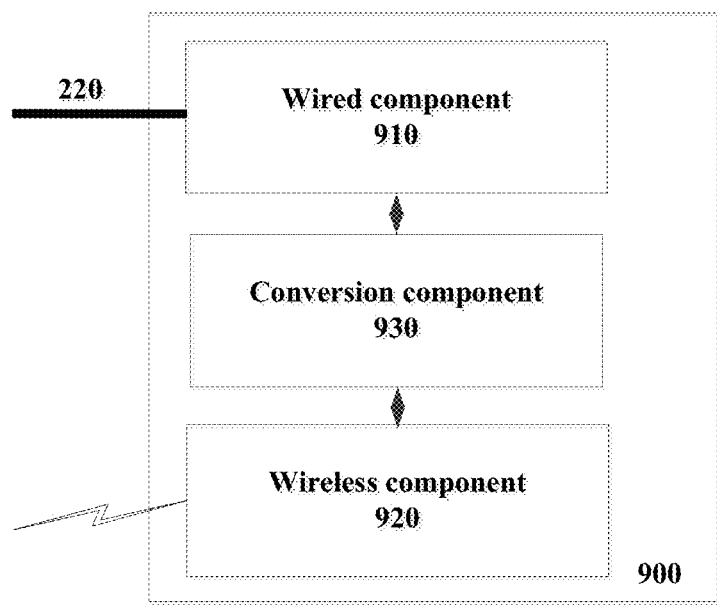
FIG. 6 is a drawing illustrating the hybrid chip 900 in FIG. 5 according to an embodiment of the invention.

FIG. 6 is a drawing illustrating the hybrid chip 900 in FIG. 5 according to an embodiment of the invention. The hybrid chip 900 comprises a wired component 910 configured for HPGP communications over power lines 220, a wireless component 920 configured for Zigbee communications via wireless medium such as vacuum, air, etc. The hybrid chip 900 further comprises a conversion component 930 communicatively coupled to the wired component 910 and the wired component 920 and configured to perform at least unidirectional conversion of a transmission unit between wireless and wired when needed. In an embodiment, the conversion employs only MAC addresses for addressing and therefore TCP/IP is not required.

Figure 7:
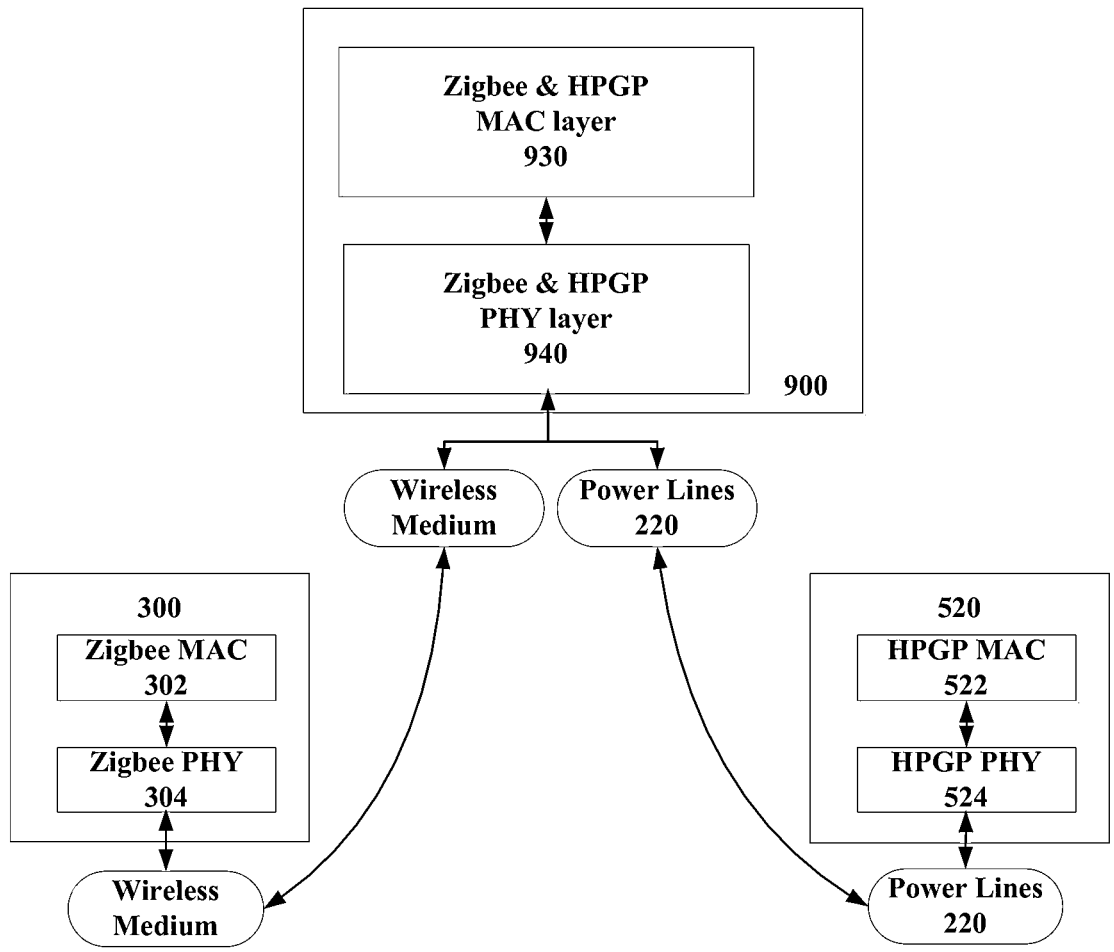
FIG. 7 is a drawing illustrating a single virtualized network in a layered form according to an embodiment of the invention.

In an embodiment, the conversion is performed in a MAC layer of the hybrid chip 900. FIG. 7 is a drawing illustrating a single virtualized network in a layered form according to an embodiment of the invention. A Zigbee & HPGP PHY layer 940 at the hybrid chip 900 is interfaced with wired and wireless medium and performs functions such as modulation, encoding, etc. as required by the Zigbee standard or HPGP standard. Conversion (also referred to as translation or protocol translation) between Zigbee and HPGP standards is performed in a Zigbee & HPGP MAC layer 930 coupled to the Zigbee & HPGP PHY layer 940.

The sensor 300, which is an exemplary Zigbee device, encapsulates generated information in a Zigbee packet, which is then sent out through a Zigbee MAC layer 302, a Zigbee PHY layer 304 into a wireless medium. For reception, a Zigbee packet arrived at the sensor 300 is demodulated and decoded in the Zigbee PHY layer 304 and then processed in the Zigbee MAC layer 302 for further applications. In an exemplary application, a received Zigbee packet is identified as a query for luminance in the house 210, a controller or a processor at the sensor 300 retrieves buffered luminance data or initiates a luminance acquisition process. The luminance data is then encapsulated in a Zigbee packet and sent wirelessly. Addressing information of the Zigbee packet, e.g., a source address and a destination address in a header of the Zigbee packet, and address translation will be described in detail below with reference to FIGS. 10a-10b.

Similarly, the TV 520 may encapsulate locally generated information in a HPGP packet, which enters the power lines 220 through a HPGP MAC layer 522 and a HPGP PHY layer 524. In reception, a HPGP packet received by the TV 520 is processed in the HPGP PHY layer 524 and the HPGP MAC layer 522 for further applications. In an embodiment, the received HPGP packet is identified as notifying the luminance in the house 210, the luminance data is extracted from the packet and applied to a preset algorithm to calculate appropriate display brightness for the TV 520. Addressing information of the HPGP packet, e.g., a source address and a destination address in a header of the HPGP packet, and address translation will be described in detail below with reference to FIGS. 10a-10b.

Figure 8:
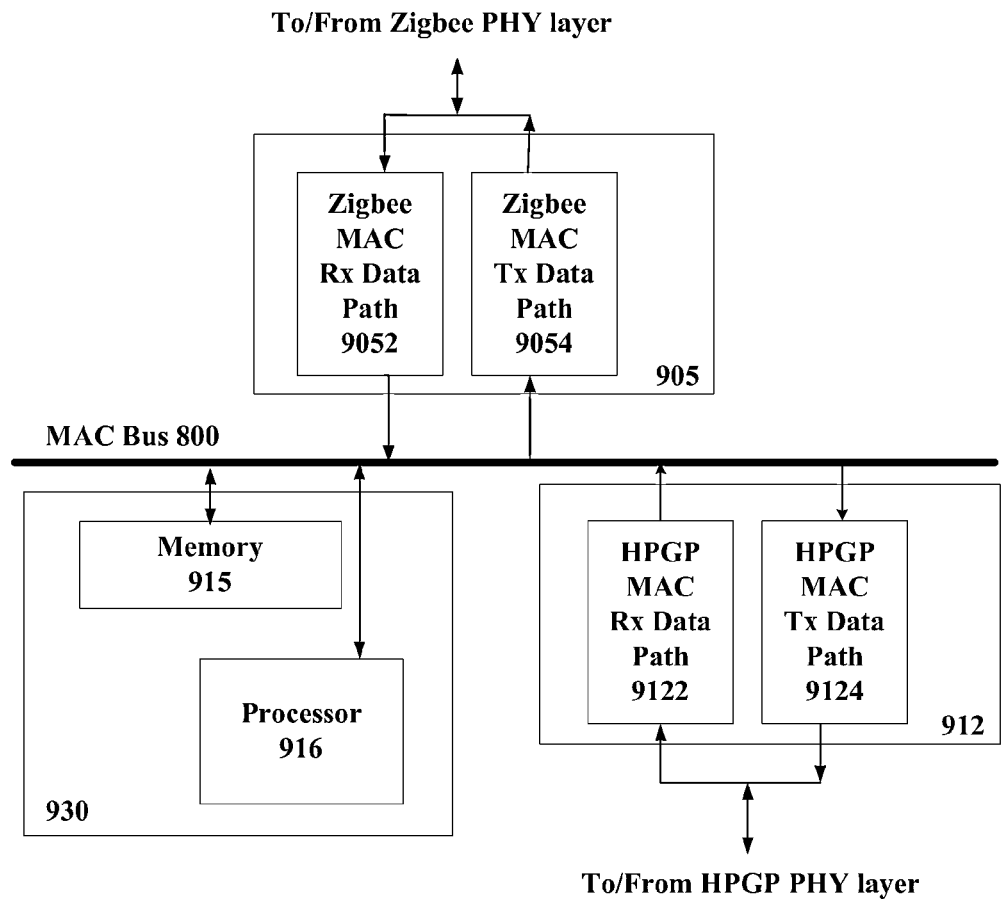
FIG. 8 is a drawing illustrating a MAC layer of the hybrid chip 900 in FIG. 6 according to an embodiment of the invention.

FIG. 8 is a block diagram illustrating the Zigbee & HPGP MAC layer module 930 illustrated in FIG. 7. A Zigbee MAC layer data path 905 includes a Zigbee MAC receiving (Rx) data path 9052 and a Zigbee MAC transmission data path 9054 both adopted for Zigbee data transmission. A HPGP MAC layer data path 912 includes a HPGP MAC Rx data path 9122 and a HPGP MAC Tx data path 9124 both adapted for HPGP data transmission. The conversion component 930 comprises a memory 915 and a processor 916. In an embodiment, the memory 915, the processor 916, the Zigbee MAC layer data path 905 and the HPGP MAC layer data path 912 are interconnected by a MAC buss 800.

Examples 1-3 will be described referring to FIGS. 3, 6, 8, 10a-10b. In these and other examples, a system configured for Zigbee communications, HPGP communications and a conversion between Zigbee communications and HPGP communications, such as the smart meter 5 in FIG. 3, may be also referred to as a Zigbee-HPGP system, or ZH system.

FIGS. 10a-10b are address tables according to an embodiment of the invention. In an embodiment, referring to FIG. 3, the smart meter 500 stores the tables in FIGS. 10a and 10b, while the sensor 300 stores the table in FIG. 10a and the TV 520 stores the table in FIG. 10b.

Refer to FIG. 10a, the sensor 300 may have a Zigbee MAC address $s_1$ assigned under Zigbee standard and an HPGP address $P(s_1)$, where $P(s_1)$ is determined based on $s_1$ and P stands for PLC, that is, $P(s_1)$ is a virtual HPGP address of the sensor 300 (which is a Zigbee device) in HPGP domain. In an embodiment, a Zigbee address is different from an HPGP in their lengths. for example, a Zigbee address may consist of 32 bits and an HPGP address is required to have 64 bits. Therefore, $P(s_1)$ may be determined by elongating $s_1$ (e.g., adding additional bits to $s_1$) and applying a Hash function to the resultant for randomization. In alternative embodiments, other suitable methods/algorithms can be used. Therefore, to some extent, $P(s_1)$ is dependent from $s_1$. However, in an alternative embodiment, determination of an HPGP address of a Zigbee device may be independent from its Zigbee address. A Hash function may also be applied for randomization of HPGP addresses of different devices including Zigbee devices, HPGP devices and ZH systems according to some embodiments of the invention. Once determined, the HPGP address of the sensor 300, e.g., $P(s_1)$ may be stored in the addressing table in FIG. 10b in association with $s_1$.

In an embodiment, TV 520, which is typically an HPGP device, is assigned with an HPGP address $t_1$. A Zigbee address $Z(t_1)$ of the TV 520 is determined based on $t_1$. For example, $t_1$ is cut down to have a number of bits which is in conformity with the Zigbee standard and then subject to a Hash functions for randomization (to avoid address conflicts). Therefore, $Z(t_1)$ is, to certain extent, dependent from $t_1$, where Z stands for Zigbee, that is, $Z(t_1)$ is a virtual Zigbee address of TV 520 (which is an HPGP device). In an alternative embodiment, the determination of a Zigbee address of TV 520 may be independent from $t_1$ and will stored in association with $t_1$ at the smart meter 500.

In an embodiment, the smart meter 500 is a valid Zigbee device in a Zigbee network and a valid HPGP device in an HPGP network. Therefore, the smart meter 500 may be assigned independently with a Zigbee address $m_1$ and an HPGP address $m_2$ which are stored in association with each other at the smart meter 500. In an alternative embodiment, the smart meter 500 is assigned with a Zigbee address $m_1$. Its HPGP address is determined by the smart meter 500 itself or any other suitable device based on $m_1$, and referred to as $P(m_1)$. In an alternative embodiment of the invention, the smart meter 500 is assigned with an HPGP address, e.g., $m_2$. Its Zigbee address is determined by the smart meter 500 or any other suitable device based on $m_2$, and referred to as $Z(m_2)$.

In an alternative embodiments, the tables in FIGS. 10a-10b may be combined to one single table. In alternative embodiments, the addresses may be stored in different data structures.

Figure 11:
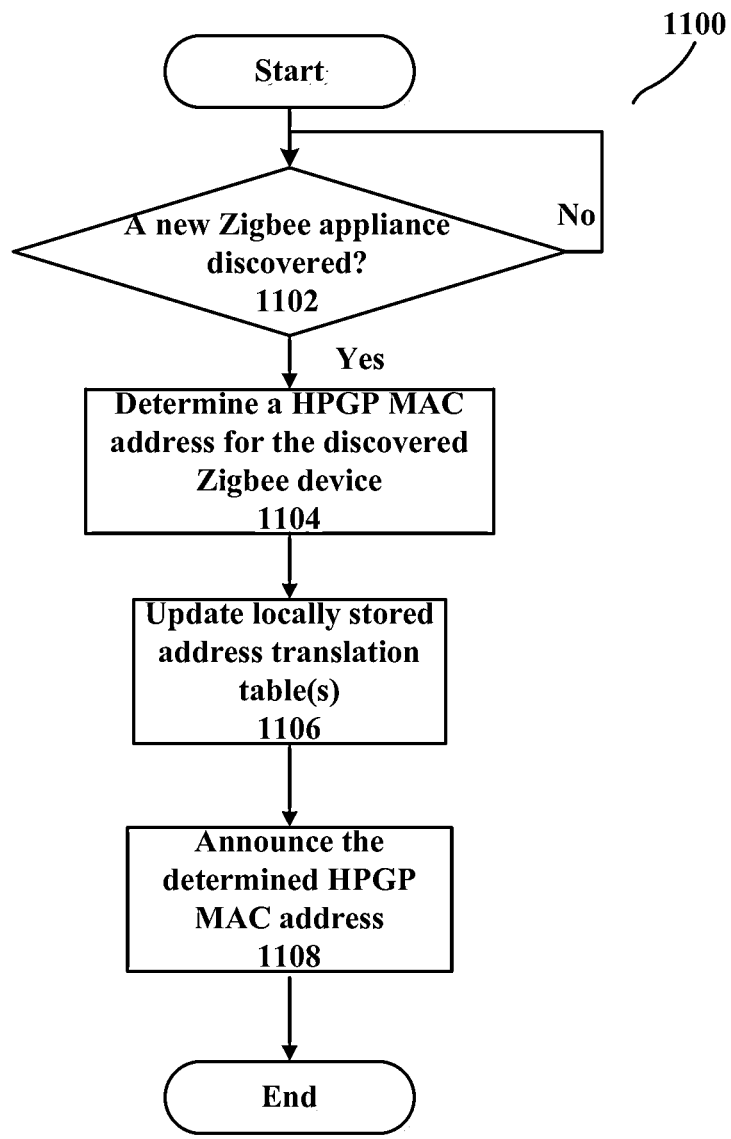
FIG. 11 is a flowchart of a method for configuring a network when a Zigbee device is joining a Zigbee network.

Tables in FIGS. 10c-10d may be created and updated in the same way as the tables in FIGS. 10a-10b. Referring to FIG. 10c-10d and FIG. 11, r1 is a Zigbee address of router 540, $r_2$ is an HPGP address of the router 540, $s_2$ is a Zigbee address of sensor 320 and $P(s_2)$ is an HPGP address of the sensor 320.

FIG. 11 is a flowchart of a method 1100 for configuring a local area network when a Zigbee device is discovered. The method 1100 starts at block 1102. At block 1102, a Zigbee-HPGP system, e.g., the smart meter 500 in the HAN 200c in FIG. 14, determines if a Zigbee device is discovered.

Specifically, the smart meter 500 listens to announcements made by a Zigbee device joining a Zigbee network in the HAN 200c. Alternatively, in case each Zigbee device makes that announcement regularly, the smart meter 500 compares a Zigbee MAC address (e.g., $s_1$ in FIG. 10a) contained in the announce denoting the sender against an address table, e.g., the one in FIG. 10a to see if the announcement is from a Zigbee device which is joining the HAN 200c. In some embodiments, a Zigbee device request joining a Zigbee network when 1) it is just switched on in the Zigbee network; 2) it moves into a coverage of the Zigbee network or 3) it is just switched to an operation mode from another mode such as an offline mode. In an embodiment, other Zigbee devices in the Zigbee network are aware of the sensor 300 when receiving the announcement from the sensor 300 as described above and will update their locally stored addressing information such as the table in FIG. 10a by adding $s_1$ as a new entry.

In case a Zigbee device, e.g., the sensor 300 is newly discovered (the Zigbee device is joining the Zigbee network), the method 1100 continues to block 1104. In case no Zigbee device is newly discovered (no Zigbee is joining the Zigbee network), the method 1100 returns to block 1102. In an embodiment, the discovery process at block 1102 is performed regularly.

At block 1104, the smart meter 500 determines an HPGP MAC address for the newly discovered Zigbee device, for example, $P(s_1)$. Other methods for determining an HPGP address for a device can also be used for the same purpose. The method 1100 continues to block 1106.

At block 1106, the Zigbee MAC address $s_1$ and the created HPGP MAC address $P(s_1)$ are stored locally at the smart meter 500, e.g., $s_1$ is stored into the table in FIG. 10a and $P(s_1)$ is stored in the table in FIG. 10b. The method 1100 then continues to block 1108.

Figure 14:
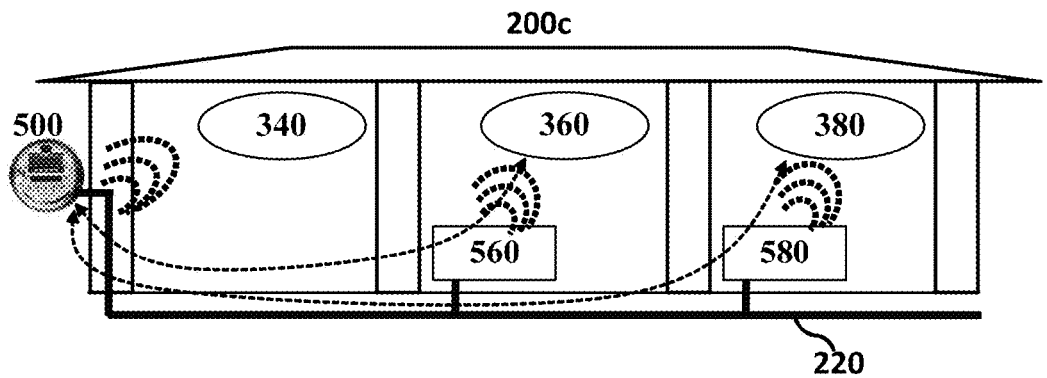
FIG. 14 is a drawing illustrating a home area network 200*c* according to an embodiment of the invention.

At block 1108, the smart meter 500, on behalf of the sensor 300, makes an announcement in an HPGP network in the HAN 200c in FIG. 14. In an embodiment, the announcement may be encapsulated under the HPGP standard such that it looks like an announcement made by a conventional HPGP device with address $P(s_1)$ which is joining the HPGP network. However, it is actually the sensor 300 with address $s_1$ which is joining the Zigbee network.

Upon receiving the announcement in the HPGP network made by the smart meter 500 for the sensor 300, HPGP devices in the HAN 200c may update their locally stored address table, e.g., the table in FIG. 10b by adding $P(s_1)$ as a new entry.

In an embodiment, the smart meter 500 may multicast or broadcast a message via the power lines 220 to inform other system(s) in the HAN 200c of what is happening. The smart meter 500, in an embodiment, may, like HPGP, transmit a "beacon" packet that all other HPGP devices in the network can see. This is similar to broadcast packet as it serves the same purpose that all devices will listen to beacon to know the status of the network. Beacons are sent out regularly. For example, the message shows that a Zigbee device with a Zigbee address $s_1$ and a virtual HPGP address $P(s_1)$ is joining the HAN 200c. The other systems then update their locally stored tables, such as tables in FIGS. 10a-10b by adding $s_1$ in the table in FIG. 10a and $P(s_1)$ in the table in FIG. 10b. Furthermore, at any of the other system, $s_1$ and $P(s_1)$ are stored in association with each other as they belong to the same device. In addition, the systems (e.g., the smart meter 500) are aware of the type of the sensor 300, e.g., a Zigbee device. In an alternative embodiment of the invention, the systems in the HAN 200c use the same algorithm/method to determine an HPGP address based on a Zigbee address, therefore each system is able to update its locally stored tables independently upon receipt of the original announcement made by the sensor 300. That is, the multicast or broadcast made by the smart meter 500 intending to inform other systems of the address pair of the sensor 300 is optional. Alternatively, a beacon packet will inform other systems of the address pair.

In an embodiment, an address (Zigbee or HPGP) assigned to a device may be released after the device leaves the network, e.g., a mobile device moves out of the coverage of a Zigbee network, is switched off or switched to an office line mode. In an embodiment, an address assigned to a device may be semi-static or static.

Example 1

Source: Sensor 300, Destination: Smart Meter 500

Referring to FIG. 3, a Zigbee packet is originated from the sensor 300. In a MAC header of the Zigbee packet, addressing information includes a source MAC address s1 and a destination MAC address $m_1$. As the smart meter 500 has a Zigbee PHY layer, the Zigbee packet can be received, demodulated and decoded appropriately. The Zigbee packet is then passed from the Zigbee PHY layer to go through a Zigbee PHY/MAC interface, a Zigbee MAC receiving data path 9052, a MAC bus 800 to the memory 915. In an embodiment, the memory 915 is an internal memory dedicated for the hybrid chip 900 or shared by different functional modules on the smart meter 500. In an alternative embodiment, the memory 915 is an external memory accessible by the hybrid chip 900 and hosted by some other device. For example, the memory 915 is hosted by another Zigbee-HPGP device in the HAN 200 which shares the memory 915 with the smart meter 500. In an embodiment of the invention, the memory 915 can include a buffer configured to buffer temporary data, i.e., a received transmission unit which shall be forwarded.

While the Zigbee packet travels through the Zigbee MAC receiving data path 9052 or the MAC bus 800, a processor 916 (a CPU or a controller) examines the MAC header to detect the destination MAC address. To identify the destination, in an embodiment, the memory 915 has stored two tables as illustrated in FIGS. 10a and 10b. Referring to FIG. 10a, the table retains 3 pairs of MAC addresses, $s_1$ and $s_2$, $m_1$ and $m_2$, $t_1$ and $t_2$. In an embodiment, each pair of the MAC addresses is additionally tagged by 1-2 bits to identify if the pair of addresses belong to a Zigbee device or a HPGP device. In addition, the smart meter 500 is aware of its own addresses.

Alternatively, the processor 916 may examine the MAC header when the data packet is in the memory 915. In FIG. 10*a*, the Zigbee MAC addresses in the table are input entries and the HPGP MAC addresses are output entries. Therefore, when a Zigbee packet is received, the processor 916 will check the table in FIG. 10*a*. In FIG. 10*b*, the HPGP MAC addresses in the table are input entries and the Zigbee MAC addresses are output entries. Therefore, when a HPGP packet is received, the processor 916 will check the table in FIG. 10*b*.

Accordingly, by comparing the destination MAC address $m_1$ in the MAC header against the table, the smart meter 500 is aware of that the sensor 300 is meant to transfer the data packet to the smart meter 500 and there is no need for translation and forwarding. The processor 916 would create a descriptor (or flag) to mark that this data packet is meant for the smart meter 500 itself The descriptor will be tagged along with the data packet and temporarily stored in the memory 915. The data packet is now residing in the correct destination device. Further operation may be needed to process the data, which will not be discussed further in this specification.

Example 2

Source: Sensor 300, Destination: TV 520

Still referring to FIG. 3, a Zigbee-formatted packet is originated at the sensor 300 and shall be sent to the TV 520. As illustrated and mentioned, each Zigbee device has a HPGP MAC address, each HPGP device has a Zigbee MAC address. At the same time, a Zigbee device may not be required to be aware of its own HPGP MAC address, a HPGP device may not be required to be aware of its own Zigbee MAC address. Accordingly, the invention can be transparent and compatible to existing Zigbee or HPGP devices. The MAC header of the Zigbee packet includes a source MAC address $s_1$ and a destination MAC address $t_1$, which means from the perspective of the sensor 300, the TV 520 is another Zigbee device identified by $t_1$.

The smart meter 500 receives the Zigbee packet. The Zigbee packet is then demodulated and decoded in the Zigbee PHY layer. The Zigbee packet is then passed from the Zigbee PHY layer to go through the Zigbee PHY/MAC interface, the Zigbee MAC receiving data path 9052, the MAC bus 800 to the memory 915.

The processor 916 detects the destination MAC address in the MAC header and compares the destination MAC address against the table illustrated in FIG. 10*a* whereby a HPGP device TV 520 is found as the destination. That means the sensor 300 is meant to transfer the data packet to the TV 520 and the smart meter 500 will need further processing to convert and transfer the data packet to the right destination. While the data packet travels through the Zigbee MAC receiving data path 9052 or the MAC bus 800, the processor 916 captures and stores the MAC header in the memory 915. In an embodiment, the MAC header is stored locally at the smart meter 500. The processor 916 further looks up HPGP MAC address corresponding respectively to $t_1$ and $s_1$, i.e., $t_2$ and $s_2$. A descriptor may be created to mark that the data packet shall be forwarded to a HPGP device with a MAC address $t_2$ and the source MAC address is $s_2$. The descriptor will be tagged along with the data packet and buffered in the memory 915.

The processor 916 will later process the data packet buffered with the descriptor in the memory 915 with knowledge that this data packet needs to be re-directed to another device (TV 520). Specifically, the processor 916 decapsulates the data packet and encapsulates the decapsulated data using the HPGP standard. In a HPGP packet generated thereby, a source MAC address is equal to $s_2$ and a destination MAC address is equal to $t_2$. After that, the HPGP packet will be then forwarded to the HPGP MAC transmission data path 9124 and then the HPGP PHY layer via the HPGP MAC/PHY interface. The newly created HPGP data packet is then transferred to the TV 520 via the power lines 220.

Example 3

Source: Sensor 300, Destination: Unidentified

In this example, a destination address in a MAC header of a Zigbee packet received from the sensor 300 is not equal to any entry in the table in FIG. 10*a*. In an embodiment, this Zigbee packet will be discarded by the smart meter 500.

Examples 4-6 will be further described referring to FIGS. 4, 6, 8, 10*a* and 10*b*. These examples focus on a HPGP packet originated from the TV 520.

Example 4

Source: TV 520, Destination: Smart Meter 500

In a MAC header of the HPGP packet, addressing information includes a source MAC address $s_2$ and a destination MAC address m2. As the smart meter 500 has a HPGP PHY layer, the HPGP packet can be received and processed appropriately. The HPGP packet is then passed from the HPGP PHY layer to go through a HPGP PHY/MAC interface, a HPGP MAC receiving data path 9122, a MAC bus 800 to the memory 915. While the HPGP packet travels through the HPGP MAC receiving data path 9122 or the MAC bus 800, the processor 916 examines the MAC header to detect the destination MAC address. Alternatively, the processor 916 may examine the MAC header when the data packet is already in the memory 915. Referring to FIG. 10*b*, the table retains 3 pairs of MAC addresses, $s_2$ and $s_1$, $m_2$ and $m_1$, $t_2$ and $t_1$. In an embodiment, each pair of the MAC addresses is additionally tagged by 1-2 bits to identify if the pair of addresses belong to a Zigbee device or a HPGP device. In addition, the smart meter 500 is aware of its own MAC address.

By comparing the destination MAC address m2 in the MAC header against the table, the smart meter 500 is aware of that the TV 520 is meant to transfer the data packet to the smart meter 500 and there is no need for translation and forwarding. The processor 916 would create a descriptor (or flag) to mark that this data packet is meant for the smart meter 500. The descriptor will be tagged along with the data packet and temporarily stored in the memory 915. The data packet is now residing in the correct destination device. Further operation may be needed to process the data, which is not discussed further in this specification.

Example 5

Source: TV 520, Destination: Sensor 300

Still referring to FIG. 4, a HPGP-formatted packet is originated at the TV 520 and shall be sent to the sensor 300. The MAC header of the HPGP packet includes a source MAC address $t_2$ and a destination MAC address $s_2$. That means for the TV 520, the sensor 300 is another HPGP device identified by $s_2$.

The smart meter 500 receives the HPGP packet. The HPGP packet is passed from the HPGP PHY layer to go through the HPGP PHY/MAC interface, the HPGP MAC receiving data path 9122, the MAC bus 800 to the memory 915.

The processor 916 detects the destination MAC address in the MAC header and compares the destination MAC address against the table illustrated in FIG. 10*b* whereby the sensor 300 is found as the destination. That means the smart meter 500 will need further processing to convert and transfer the data packet to the right destination. While the data packet travels through the HPGP MAC receiving data path 9122 or the MAC bus 800, the processor 916 captures and stores the MAC header in the memory 915 for address translation purpose. In an embodiment, the MAC header is stored locally at the smart meter 500. The processor 916 further looks up Zigbee MAC address corresponding respectively to $t_2$ and $s_2$, i.e., $t_1$ and $s_1$. A descriptor may be created to mark that the data packet shall be forwarded to a Zigbee device with a MAC address which is equal to $s_1$ and the source MAC address is t1. The descriptor will be tagged along with the data packet and buffered in the memory 915.

The processor 916 will later process the data packet buffered with the descriptor in the memory 915 with knowledge that this data packet needs to be re-directed to another device (sensor 300). Specifically, the processor 916 decapsulates the data packet and encapsulates the resultant using Zigbee standard. In a Zigbee packet generated whereby, a source MAC address is equal to t1 and a destination MAC address is equal to $s_1$. After that, the Zigbee packet will be forwarded to the Zigbee MAC transmission data path 9054 and then the Zigbee PHY layer via the Zigbee MAC/PHY interface. The newly created Zigbee data packet is then transmitted wirelessly by a Zigbee transceiver.

Example 6

Source: TV 520, Destination: Unidentified

In this example, a destination address in a MAC header of a HPGP packet received from the TV 520 is not equal to any input entry in the table in FIG. 10*b*. In an embodiment, this HPGP packet will be discarded by the smart meter 500.

Figure 9:
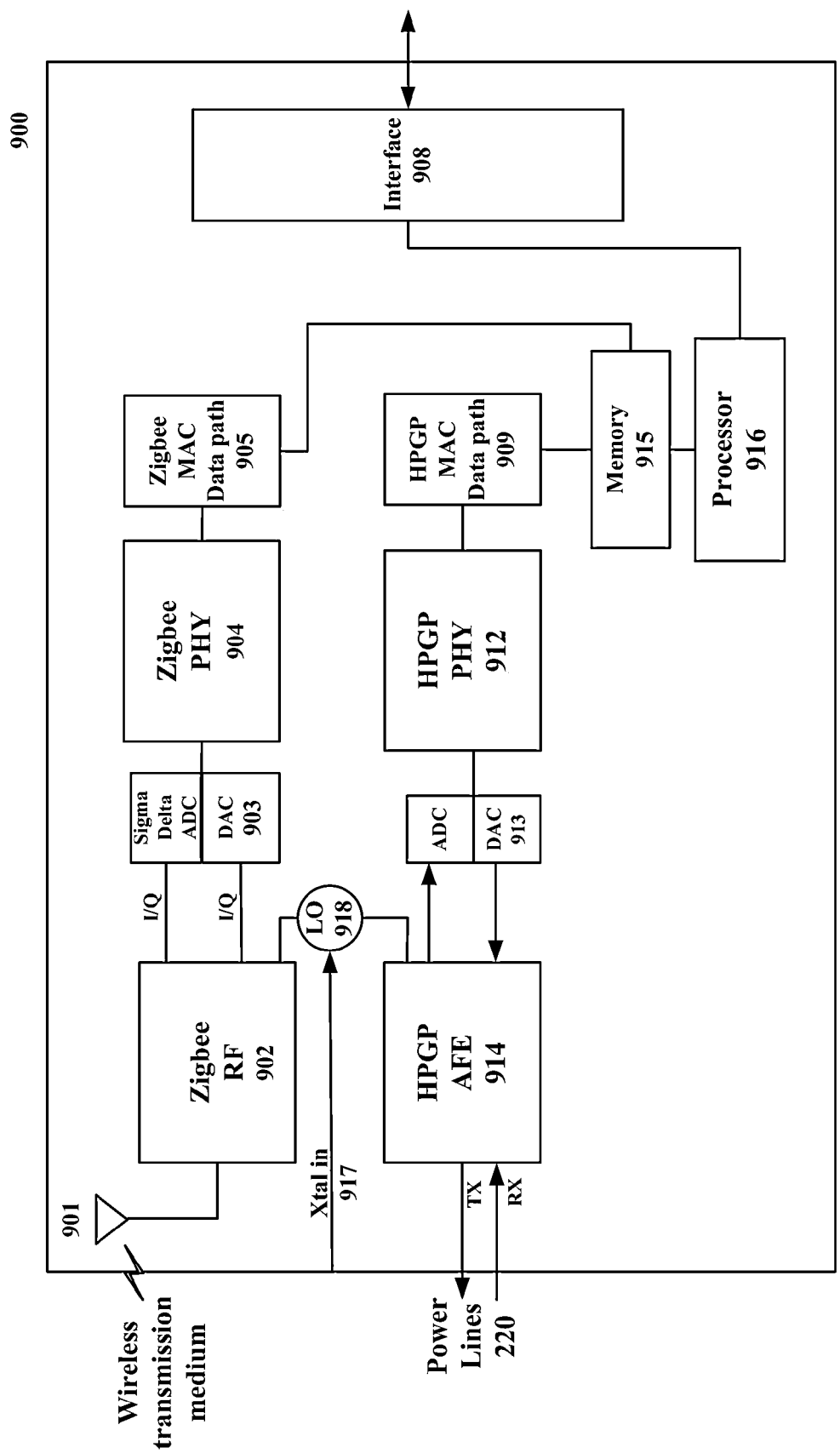
FIG. 9 is a drawing illustrating a detailed structure of the hybrid chip 900 as described with reference to FIGS. 5-8.

FIG. 9 is a drawing illustrating a detailed structure of an adaptor (also referred to translator or translator module) 900 as described with reference to FIGS. 5 and 6. A wireless (Zigbee) component 920 as discussed above may include an antenna 901, a Zigbee radio frequency (RF) module 902, an analog to digital converter (ADC) and digital to analog converter (DAC) jointly marked as 903, e.g., a Sigma Delta ADC, a Zigbee PHY layer 904, a Zigbee MAC data path 905. A wired (HPGP) component 910 as discussed above may include a HPGP analog front end (AFE) module 914, an ADC/DAC 913, a HPGP PHY module 912 and a HPGP MAC data path 909. A conversion component 930 as discussed above may include a memory 915 and a processor 916. The processor 916 is further coupled to other components or applications hosted by the smart meter 500 via an interface 908.

Additional reference will be made below with respect to the tables in FIGS. 10*a*-10*d*.

Briefly, the tables keep track of all smart devices existing in the HAN 200.

1. Generation

When a Zigbee device, e.g., the sensor 300 is joining the HAN 200, the sensor 300 makes an announcement to the Zigbee network about Zigbee MAC address of the sensor 300 and related protocols. The smart meter 500 listens to the announcement and records the Zigbee MAC address of the sensor 300. The smart meter 500 then creates a corresponding HPGP MAC address for the sensor 300. A table is then generated and may be updated in the same fashion. The generated table may further include HPGP and Zigbee MAC addresses of the smart meter 500.

After that, the smart meter 500 will make an announcement in the HPGP network on behalf of the sensor 300 that a new "HPGP" device is joining the HPGP network using the HPGP address that is just created. To other HPGP device(s) such as TV 520, a new HPGP device is joining the HPGP network, but in fact, that is a new Zigbee device joining the Zigbee network.

Similarly, when a HPGP device is joining the HAN 200, the HPGP device may make an announcement via the power lines 220 to the HPGP network about a HPGP MAC address of the HPGP device and related protocols. The smart meter 500 listens to the announcement and records the HPGP MAC address. The smart meter 500 then creates a corresponding Zigbee MAC address for the HPGP device. The table is then generated. The generated table may further include HPGP and Zigbee MAC addresses of the smart meter 500. The smart meter 500 may additionally makes an announcement wirelessly in the Zigbee network that a new "Zigbee" device is joining the Zigbee network using the Zigbee MAC address that is just created.

Note that the smart meter 500 may be not the first device in the HAN 200. In an embodiment, all Zigbee devices and HPGP devices in the HAN 200 make the above-mentioned announcement (e.g., sends a beacon packet or message) regularly, which is similar to heart beat messages indicating existence of a device. In an embodiment, each network has a Coordinator which is either Zigbee device or HPGP device. The Coordinator sends out beacon message regularly to update the status of the network such as new device is joining or a device is terminated/out. In case there is another Zigbee-HPGP device in the HAN 200, the smart meter 500 may inquire of the another Zigbee-HPGP device about corresponding HPGP MAC address of each Zigbee device and corresponding Zigbee MAC address of each HPGP device. In case the smart meter 500 is the only one Zigbee-HPGP device, the smart meter 500 may create a HPGP MAC address for each Zigbee device and create a Zigbee MAC address for each HPGP device.

Alternatively, when the smart meter 500 joins the HAN 200 later than other device(s), the smart meter 500 may receive data packets traveling in the HAN 200 to acquire MAC addresses thereof.

In an alternative embodiment of the invention, a HPGP MAC address of a Zigbee device can be generated by a dedicated external server or any other appropriate device and assigned to the Zigbee device, the smart meter 500 can announce the assigned HPGP MAC address in the HPGP network after being informed. For a newly discovered wired device, briefly, the smart meter 500 will create and announce a Zigbee MAC address in the Zigbee network.

2. Update

More entries may be added in a similar way to when the tables are generated.

Note that a new created HPGP/Zigbee MAC address usually should be different from any existing HPGP/Zigbee MAC address in the tables to avoid address conflicts.

When a Zigbee device is leaving the Zigbee network, the smart meter 500 deletes the HPGP and Zigbee addresses of the leaving device and announces in the HPGP network that the device is "leaving" the HPGP network. Similarly, when a HPGP device is leaving the HPGP network, the smart meter 500 deletes the HPGP and Zigbee addresses of the leaving device and announces in the Zigbee network that the device is "leaving" the Zigbee network.

Layout of a local area network may be more complicated than as illustrated in FIGS. 2-4. The description below will focus on some exemplary cases.

Example 7

Two Zigbee Devices are Out of Distance from Each Other

Figure 12:
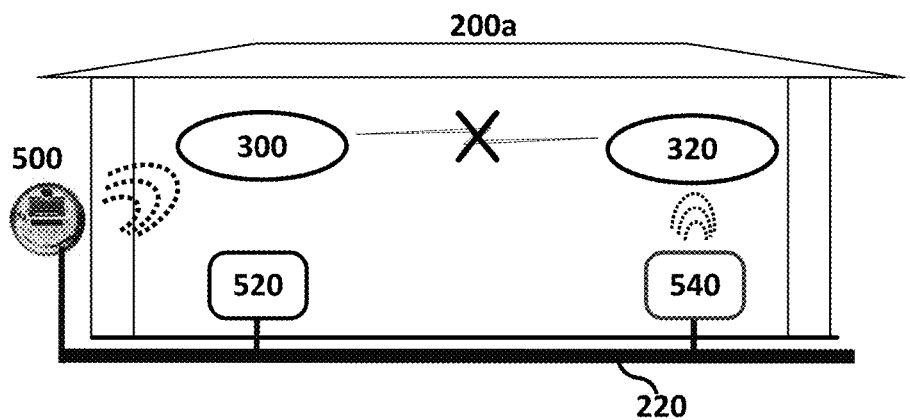
FIG. 12 is a drawing illustrating a home area network 200*a* according to an embodiment of the invention.

FIG. 12 is a drawing illustrating a local area network 200a according to an embodiment of the invention. In this example, another Zigbee device e.g., a sensor 320 and another Zigbee-HPGP device 540 e.g., a router have joined the HAN 200. According to the generation and update procedures of tables as discussed above, both the smart meter 500 and the router 540 have stored tables in FIGS. 10c and 10d. Specifically, the sensor 320 has a Zigbee MAC address s3 and a HPGP MAC address s4, the router 540 has a Zigbee MAC address r1 and a HPGP MAC address r2.

As mentioned above, a Zigbee-HPGP device may also relay communications between Zigbee devices in certain scenarios. In FIG. 11, the sensors 300 and 320 are suffering intolerable signal quality caused by the distance therebetween. Accordingly, relay is needed to interconnect the two sensors. Taking transmission from the sensor 300 to the sensor 320 as an example, a possible path may be sensor 300—>wireless medium (e.g., air)—>smart meter 500—>power lines 220—>router 540—>wireless medium—>sensor 320, hereinafter referred to path 1. An alternative path is sensor 300—>wireless medium—>router 540—>sensor 320 which requires a Zigbee transceiver at the router 540 has higher signal reception sensitivity than the one at sensor 320, hereinafter referred to as path 2.

In an embodiment, to enable packet forwarding and/or relay, the HAN 200 may need a mechanism for each Zigbee-HPGP device to determine if a received packet (not meant for this current device) shall be forwarded, or shall be discarded locally. For example, when a HPGP packet a destination of which is a HPGP device is received, the Zigbee-HPGP device will not forward the packet. That is because wired communications usually are more robust than wireless communications, the HPGP packet has a fair chance to get to the right destination without forwarding. Alternatively, the Zigbee-HPGP device may forward the packet via the power lines 220 and make a record that this packet has been already forwarded to avoid endless forwarding. In an embodiment, a destination of a packet may receive duplicate packets, accordingly, data packets may be assigned serial numbers and the destination may make a record that No. n packet has been received and discard the later received duplicate.

In wireless domain, according to an embodiment of the invention, Zigbee devices in the HAN 200 may be assigned to different Zigbee-HPGP devices. Without loss of generality, in FIG. 11, the sensor 300 is assigned to the smart meter 500 and the sensor 320 is assigned to the router 540.

An operator, an IT professional or any other technician may determine the assignment according to relative position of the devices in the HAN 200.

Alternatively, the assignment may be carried out by the HAN 200 automatically and dynamically. For example, when sensor 300 is joining the Zigbee network, the smart meter 500 measures wireless channel based on the quality of signal received from the sensor, e.g., the announcement as discussed above. If the strength is above a preset strength threshold, the smart meter 500 may determines that the smart meter 500 will be responsible for all relay functions relating to the sensor 300 and notifies the same to other Zigbee-HPGP devices via the power lines 220 or the wireless medium. In embodiments of the invention, the assignment may be accomplished in other ways.

In an embodiment of the invention, the assignment is tagged along with each pair of the MAC addresses. For example, in the table 3 in FIG. 10c, a tag is in association with $s_1$, $s_2$ indicating that the sensor 300 is assigned to the smart meter 500, another tag is in association with $s_3$, $s_4$ indicating that the sensor 320 is assigned to the router 520. In an alternative embodiment, in a certain Zigbee-HPGP device, MAC addresses in the tables only indicate the assignment in relation to the Zigbee device(s) assigned to this certain Zigbee-HPGP device.

These and other aspects, features and embodiments of the assignment will become clearer by reading the description below.

Path 1

The sensor 300 generates a Zigbee packet. A MAC header of that Zigbee packet includes a destination MAC address s3 and a source MAC address $s_1$. The smart meter 500 re-formats the packet to generate a HPGP packet. The HPGP packet is forwarded over the power lines 220. After receiving the HPGP packet, the router 520 examines the MAC header thereof and compare the destination MAC address s4. The router 520 will find that the packet should be re-formatted again and forwarded. The HPGP packet is hence re-formatted to a Zigbee packet having a destination MAC address s3 and a source MAC address $s_1$.

Path 2

In an embodiment, a Zigbee packet is still recognizable when arriving the router 540. Hence the Zigbee packet will be forwarded wirelessly to the sensor 320 by the router 540.

As wireless communications are sometimes more vulnerable to variant channel conditions, in an embodiment of the invention, path 1 and path 2 are both enabled. At the destination, the sensor 320 combines the duplicated copies of the data packet or uses one copy to check the other, in order to increase the possibility of successful reception.

By reading Example 7 above, the procedure when the sensor 320 is sending a Zigbee packet to the sensor 300 should be clear to one of ordinary skill in the art, no more reference will be made thereto accordingly.

Alternatively, a Zigbee-HPGP device can be placed near the center of the house. The central Zigbee-HPGP device receives Zigbee packets and determines if the packet is meant for a Zigbee device. If so, the central Zigbee-HPGP device sends the Zigbee packet wirelessly with a transmission power stronger than battery-operated Zigbee devices.

Example 8

Zigbee Devices are Separated by Obstacle(s)

Figure 13:
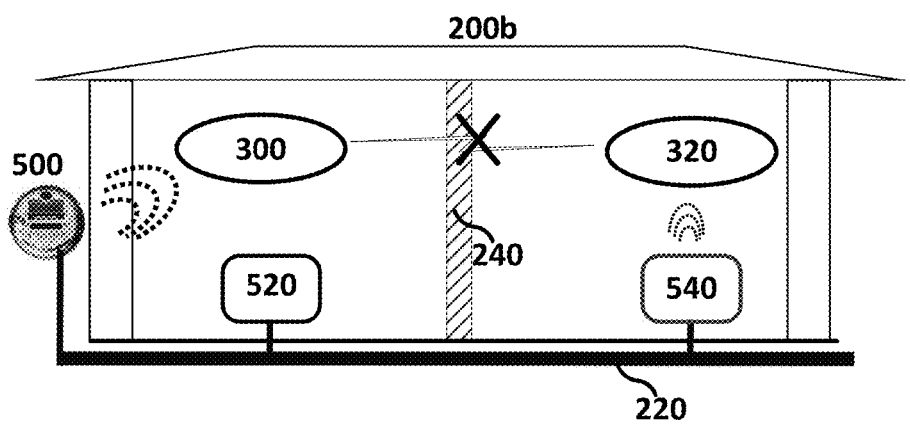
FIG. 13 is a drawing illustrating a home area network 200*b* according to an embodiment of the invention.

FIG. 13 is a drawing illustrating a local area network 200b according to an embodiment of the invention. In this example, the interconnection between the sensor 300 and the sensor 320 are blocked by a concrete wall 240.

Example 8 is substantially the same with example 7 except that the path 2 is unavailable due to the concrete wall 240.

Example 9

More Devices

FIG. 14 is a drawing illustrating a home area network 200c according to an embodiment of the invention. A HAN 200c includes three Zigbee devices 340, 360 and 380, three Zigbee-HPGP devices 500, 560 and 580. With a deployment in FIG. 13, Zigbee standard is employed for in-room, short range or battery-operated devices, while the power lines 220 are used as backbones to transport Zigbee communications in special cases as discussed above.

In an embodiment of the invention, non-interoperable standards include two wireless standards. Aspects of the invention can be applied in this case by replacing Zigbee with one standard and replacing HPGP with the other.

Figure 15:
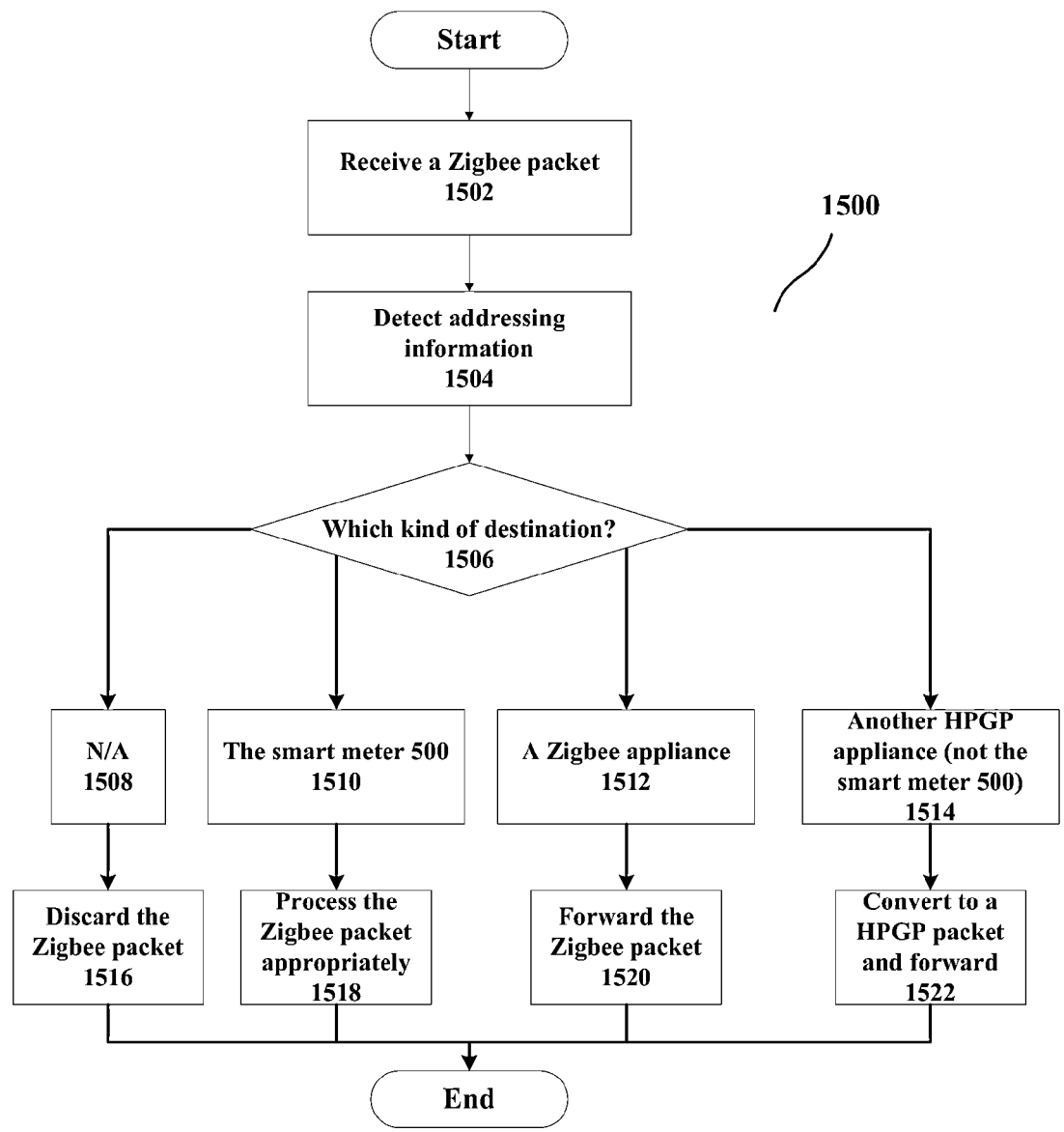
FIG. 15 is a flowchart of a method for information transmission in a network according to an embodiment of the invention.

FIG. 15 is a flowchart illustrating a method 1500 in a local area network according to an embodiment of the invention. The method 1500 starts at block 1502.

At block 1502, a Zigbee-HPGP device, e.g., the smart meter 500, receives a Zigbee packet. In an embodiment, the smart meter 500 can only receive Zigbee-formatted packets via a Zigbee PHY layer and a Zigbee MAC layer, and can only receive HPGP-formatted packets via a HPGP PHY layer and a HPGP MAC layer. Accordingly, the smart meter 500 can recognize that a Zigbee packet or a HPGP packet has been received without additional identification techniques.

At block 1504, addressing information which usually include MAC addresses are detected, such that the smart meter 500 is aware of a destination MAC address and a source MAC address of the received Zigbee packet.

At block 1506, the smart meter 500 compares the detected destination MAC address against table(s) illustrated in FIG. 10a or FIG. 10c. There are 4 cases that can happen.

At block 1508, the destination MAC address is not found in the table(s). In an embodiment of the invention, the Zigbee packet is hence discarded in block 1416.

At block 1510, the destination MAC address matches a Zigbee MAC address of the smart meter 500. In an embodiment, the smart meter 500 will create a descriptor or flag to mark that this Zigbee packet is meant for the current device. The descriptor will be tagged along with the Zigbee packet and temporarily stored. Further operation will be needed to process the data packet in block 1518, which will not be described herein.

At block 1512, the destination MAC address matches a Zigbee MAC address of a Zigbee device in the local area network, e.g., LAN 200 in FIG. 2. At block 1420, in an embodiment of the invention, the smart meter 500 forwards the Zigbee packet wirelessly.

At block 1514, the destination MAC address matches a Zigbee MAC address of another HPGP device in the local area network, e.g., TV 520 in FIG. 2. At block 1422, the smart meter 500 decapsulates the received Zigbee packet and encapsulates the resultant in a HPGP packet. The HPGP packet is then sent to the destination over the power lines 220.

Figure 16:
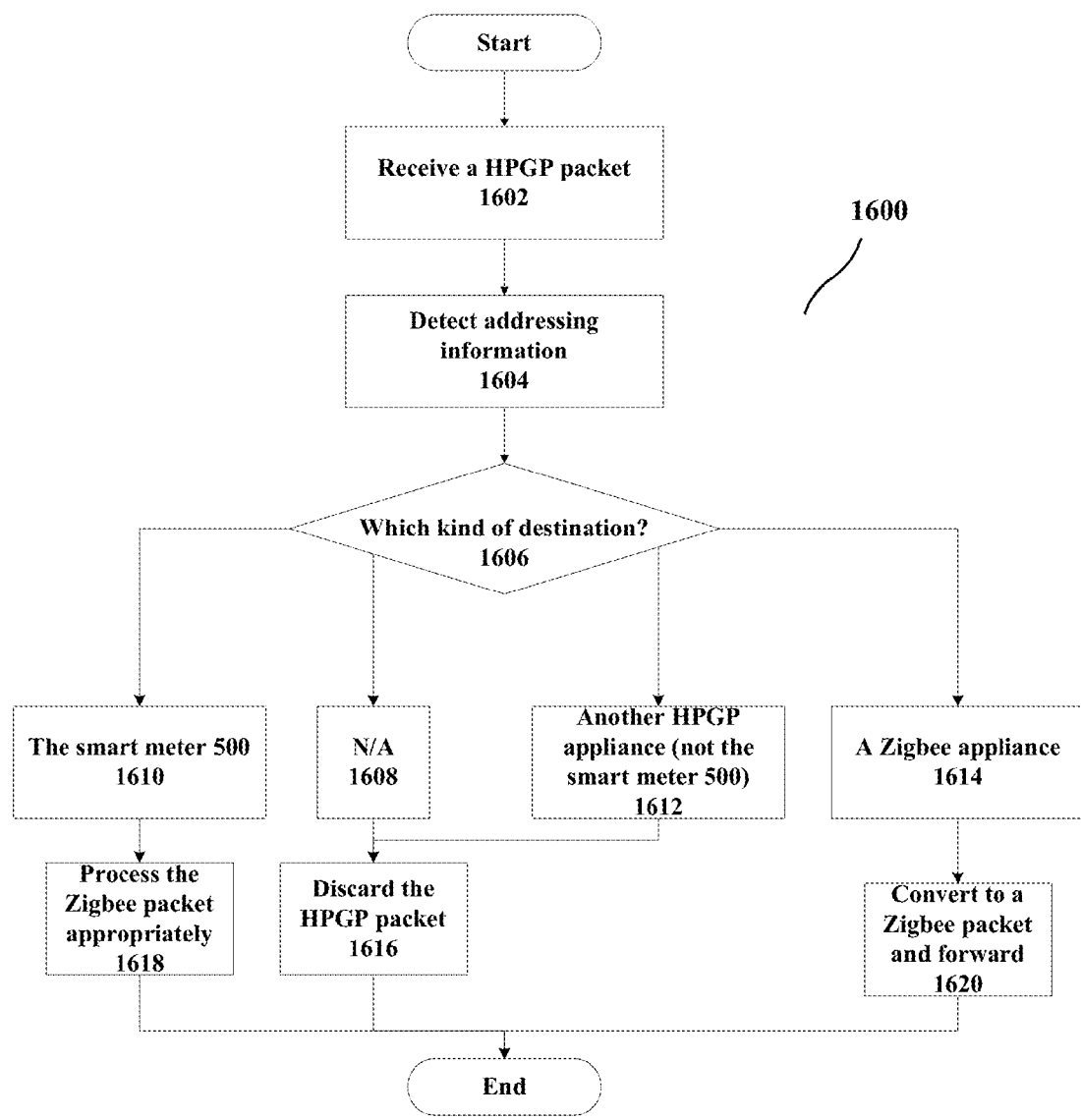
FIG. 16 is a flowchart of a method for information transmission in a network according to an embodiment of the invention.

FIG. 16 is a flowchart illustrating a method 1600 in a local area network according to an embodiment of the invention. The method 1500 starts at block 1502.

At block 1602, a Zigbee-HPGP device, e.g., the smart meter 500, receives a HPGP packet.

At block 1604, addressing information which usually include MAC addresses are detected, such that the smart meter 500 is aware of a destination MAC address and a source MAC address of the received HPGP packet.

At block 1606, the smart meter 500 compares the detected destination MAC address against table(s) illustrated in FIG. 10b or FIG. 10d. There are 4 cases that can happen.

At block 1608, the destination MAC address is not found in the table(s). In an embodiment of the invention, the HPGP packet is hence discarded in block 1516.

At block 1610, the destination MAC address matches a HPGP MAC address of the smart meter 500. In an embodiment, the smart meter 500 will create a descriptor or flag to mark that this HPGP packet is meant for the current system. The descriptor will be tagged along with the HPGP packet and temporarily stored. Further operation will be needed to process the data packet in block 1618, which will not be described herein.

At block 1612, the destination MAC address matches a HPGP MAC address of another HPGP device in the local area network, e.g., LAN 200 in FIG. 2. In an embodiment of the invention, as discussed above, the smart meter 500 will discard the HPGP packet.

At block 1614, the destination MAC address matches a HPGP MAC address of a Zigbee device in the local area network, e.g., sensor 300 in FIG. 2. At block 1520, the smart meter 500 decapsulates the received HPGP packet and encapsulates the resultant in a Zigbee packet. The Zigbee packet is then sent to the destination via the wireless medium.

Unless the context clearly requires otherwise, throughout the description and the claims, the words "comprises", and the line are to be construed in an inclusive sense, as opposed to an exclusive or exhaustive sense; that is to say, in the sense of "including, but not limited to". As used herein, the terms "connected", "coupled" or any variant thereof, means any connection or coupling, either direct or indirect, between two or more elements; the coupling of connection between the elements can be physical, logical, or a combination thereof. Additionally, the words "herein", "above", "below", and words of similar import, where used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
   a smart grid wireless component;
   a power line communication component configured to interface with power lines;
   a conversion component communicatively coupled to the smart grid wireless component and the power line communication component and performs at least unidirectional conversion of a packet between smart grid wireless and a power line communication standards, wherein the conversion employs only MAC addresses for addressing,
   wherein the conversion component comprises a processor configured to detect a MAC address of a received packet and process the received packet according to the detection,
   wherein the conversion component further comprises a memory configured to store the received packet, the system further comprises a bus coupled to the processor, the memory, a MAC layer of the smart grid wireless component and a MAC layer of the power line communication component, the processor detects a MAC address of a received power line communication packet when the received power line communication packet is in the bus or the MAC layer of the power line communication component, the processor detects a MAC address of a received smart grid wireless packet when the received smart grid wireless packet is in the bus or the MAC layer of the smart grid wireless component, wherein the memory is further configured to store a table retaining a smart grid wireless MAC address and a power line communication MAC address for each power line communication device and each smart grid wireless device in a network, wherein the processor processes the packet by comparing a destination MAC address of a power line communication packet received from a power line communication device against the table, if the comparison indicates that a destination of the power line communication packet is a smart grid wireless device, the processor further looks up a smart grid wireless MAC address of the power line communication device and a smart grid wireless address of the smart grid wireless device in the table, wherein the processor further generates a smart grid wireless packet using the smart grid wireless MAC address of the power line communication device stored in association with the power line communication packet as a source MAC address, and uses the smart grid wireless MAC address of the smart grid wireless device stored in association with the power line communication packet as a destination MAC address;

the smart grid wireless component is further configured to send out the generated smart grid wireless packet wirelessly;

the memory is further configured to store the smart grid wireless MAC address of the power line communication device and the smart grid wireless MAC address of the smart grid wireless device.

2. A system, comprising:
a smart grid wireless component;
a power line communication component configured to interface with power lines;
a conversion component communicatively coupled to the smart grid wireless component and the power line communication component and performs at least unidirectional conversion of a packet between smart grid wireless and a power line communication standards, wherein the conversion employs only MAC addresses for addressing, wherein the conversion component comprises a processor configured to detect a MAC address of a received packet and process the received packet according to the detection, wherein the conversion component further comprises a memory configured to store the received packet, the system further comprises a bus coupled to the processor, the memory, a MAC layer of the smart grid wireless component and a MAC layer of the power line communication component, the processor detects a MAC address of a received power line communication packet when the received power line communication packet is in the bus or the MAC layer of the power line communication component, the processor detects a MAC address of a received smart grid wireless packet when the received smart grid wireless packet is in the bus or the MAC layer of the smart grid wireless component, wherein the memory is further configured to store a table retaining a smart grid wireless MAC address and a power line communication MAC address for each power line communication device and each smart grid wireless device in a network, wherein the processor further compares a destination MAC address of a smart grid wireless packet received from a smart grid wireless device against the table, if the comparison indicates that a destination of the smart grid wireless packet is a power line communication device, the processor further looks up a power line communication MAC address of the smart grid wireless device and a power line communication MAC address of the power line communication device in the table;

the memory is further configured to store the power line communication MAC address of the smart grid wireless device, the power line communication MAC address of the power line communication device in association with the smart grid wireless packet.

3. The system of claim 2, wherein the processor further re-encapsulate the smart grid wireless packet to generate a power line communication packet which uses the power line communication MAC address of the smart grid wireless device stored in association with the received smart grid wireless packet as a source MAC address, and uses the power line communication MAC address of the power line communication device stored in association with the received smart grid wireless packet as a destination MAC address;

the power line communication component is further configured to send out the generated power line communication packet through the power lines.

4. The system of claim 2, wherein the processor obtains a power line communication MAC address for a smart grid wireless device newly discovered in the local area network, and update the table by adding a smart grid wireless MAC address of the discovered smart grid wireless device in association with the obtained power line communication MAC address in the table, the power line communication component is further configured to announces over the power lines that a new power line communication device having the obtained power line communication MAC address has joined a wired network in the local area network.

5. The system of claim 2, wherein the processor obtains a smart grid wireless MAC address for a power line communication device newly discovered in the local area network, and updates the table by adding a power line communication MAC address of the discovered power line communication device in association with the obtained smart grid wireless MAC address in the table, the smart grid wireless component is further configured to announces wirelessly that a new smart grid wireless device having the obtained smart grid wireless MAC address has joined a smart grid wireless network in the local area network.

6. A system, comprising:
a smart grid wireless component;
a power line communication component configured to interface with power lines;
a conversion component communicatively coupled to the smart grid wireless component and the power line communication component and performs at least unidirectional conversion of a packet between smart grid wireless and a power line communication standards, wherein the conversion employs only MAC addresses for addressing, wherein the conversion component comprises a processor configured to detect a MAC address of a received packet and process the received packet according to the detection, wherein the conversion component further comprises a memory configured to store the received packet, the system further comprises a bus coupled to the processor, the memory, a MAC layer of the smart grid wireless component and a MAC layer of the power line communication component, the processor detects a MAC address of a received power line communication packet when the received power line communication packet is in the bus or the MAC layer of the power line communication component, the processor detects a MAC address of a received smart grid wireless packet when the received smart grid wireless packet is in the bus or the MAC layer of the smart grid wireless component, wherein the memory is further configured to store a table retaining a smart grid wireless MAC address and a power line communication MAC address for each power line communication device and each smart grid wireless device in a network wherein the processor further compares a destination MAC address of a smart grid wireless packet received from a first smart grid wireless device against the table, if the comparison indicates that a destination of the smart grid wireless packet is a second smart grid wireless device, and if a preset condition is met, the processor looks up a power line communication MAC address of the first-smart grid wireless device and a power line communication MAC address of the second smart grid wireless device in the table;

the memory is further configured to store the power line communication MAC address of the first smart grid wireless device and the power line communication MAC address of the second smart grid wireless in association with the received smart grid wireless packet.

7. The system of claim 6, wherein the processor re-encapsulates the smart grid wireless packet to generate a power line communication packet which uses the power line communication MAC address of the first smart grid wireless device as a source MAC address, and uses the power line communication MAC address of the second smart grid wireless device as a destination MAC address;

the power line communication component is further configured to send out the generated power line communication packet over the power lines.

8. The system of claim 6, wherein the preset condition includes that signal quality between the first and second smart grid wireless devices is below a predetermined signal quality level.

9. The system of claim 6, wherein the preset condition includes that the first and second smart grid wireless devices employ non-interoperable information communication technologies.

10. A system, comprising:
a smart grid wireless component;
a power line communication component configured to interface with power lines;
a conversion component communicatively coupled to the smart grid wireless component and the power line communication component and performs at least unidirectional conversion of a packet between smart grid wireless and a power line communication standards, wherein the conversion employs only MAC addresses for addressing, wherein the conversion component comprises a processor configured to detect a MAC address of a received packet and process the received packet according to the detection, wherein the conversion component further comprises a memory configured to store the received packet, the system further comprises a bus coupled to the processor, the memory, a MAC layer of the smart grid wireless component and a MAC layer of the power line communication component, the processor detects a MAC address of a received power line communication packet when the received power line communication packet is in the bus or the MAC layer of the power line communication component, the processor detects a MAC address of a received smart grid wireless packet when the received smart grid wireless packet is in the bus or the MAC layer of the smart grid wireless component, wherein the memory is further configured to store a table retaining a smart grid wireless MAC address and a power line communication MAC address for each power line communication device and each smart grid wireless device in a network wherein the processor further compares a destination MAC address of a smart grid wireless packet received from a first smart grid wireless device against the table, if the comparison indicates that a destination of the smart grid wireless packet is a second smart grid wireless device, the smart grid wireless component is further configured to relay the smart grid wireless packet wirelessly.

11. A method, comprising:
receiving a packet at a system connected to power lines in a network;
detecting, by a device, addressing information of the packet;
in case the packet belongs to communication between a power line communication device and a smart grid wireless device, converting the packet by the device to comply with a destination of the packet, wherein the conversion employs only MAC address for addressing;
sending the converted packet to the destination,
wherein detecting the addressing information of the packet comprises comparing a destination MAC address of a power line communication packet received from a power line communication device against the table;
the conversion comprises, if the comparison indicates that a destination of the power line communication packet is a smart grid wireless device:
looking up a smart grid wireless MAC address of the power line communication device and a smart grid wireless address of the smart grid wireless device in the table;
re-encapsulating the power line communication packet to generate a smart grid wireless packet which uses the smart grid wireless MAC address of the power line communication device as a source MAC address, and uses the smart grid wireless MAC address of the smart grid wireless device as a destination MAC address;
sending the converted packet comprises sending the generated smart grid wireless packet wirelessly.

12. The method of claim 11, further comprising storing a table at the device which retains a smart grid wireless MAC address and a power line communication MAC address for each power line communication device and each smart grid wireless device in the local area network.

13. A method, comprising:
receiving a packet at a system connected to power lines in a network;

detecting, by a device, addressing information of the packet;

in case the packet belongs to communication between a power line communication device and a smart grid wireless device, converting the packet by the device to comply with a destination of the packet, wherein the conversion employs only MAC address for addressing;

sending the converted packet to the destination, wherein detecting the addressing information of the packet comprises comparing a destination MAC address of a smart grid wireless packet received from a smart grid wireless device against the table;

the conversion further comprises, if the comparison indicates that a destination of the smart grid wireless packet is a power line communication device:

looking up a power line communication MAC address of the smart grid wireless device and a power line communication address of the power line communication device in the table;

re-encapsulating the smart grid wireless packet to generate a power line communication packet which uses the power line communication MAC address of the smart grid wireless device as a source MAC address, and uses the power line communication MAC address of the power line communication device as a destination MAC address;

sending the converted packet comprises sending the generated power line communication packet over the power lines.

14. A method, comprising:

receiving a packet at a system connected to power lines in a network;

detecting, by a device, addressing information of the packet;

in case the packet belongs to communication between a power line communication device and a smart grid wireless device, converting the packet by the device to comply with a destination of the packet, wherein the conversion employs only MAC address for addressing;

sending the converted packet to the destination, wherein detecting the addressing information of the packet comprises comparing a destination MAC address of a smart grid wireless packet received from a first smart grid wireless device against the table;

the conversion further comprises, if the comparison indicates that a destination of the smart grid wireless packet is a second smart grid wireless device, and if a preset condition is met:

looking up a power line communication MAC address of the first smart grid wireless device and a power line communication MAC address of the second smart grid wireless device in the table;

re-encapsulating the smart grid wireless packet to generate a power line communication packet which uses the power line communication MAC address of the first Zigbee device as a source MAC address, and uses the power line communication MAC address of the second smart grid wireless device as a destination MAC address;

sending the converted packet further comprises sending the generated power line communication packet over the power lines.

15. A method, comprising:

receiving a packet at a system connected to power lines in a network;

detecting, by a device, addressing information of the packet;

in case the packet belongs to communication between a power line communication device and a smart grid wireless device, converting the packet by the device to comply with a destination of the packet, wherein the conversion employs only MAC address for addressing;

sending the converted packet to the destination, wherein detecting the addressing information of the packet comprises comparing a destination MAC address of a smart grid wireless packet received from a first smart grid wireless device against the table;

if the comparison indicates that a destination of the smart grid wireless packet is a second smart grid wireless device, relaying the smart grid wireless packet wirelessly.

16. A method, comprising:

receiving a packet at a system connected to power lines in a network;

detecting, by a device, addressing information of the packet;

in case the packet belongs to communication between a power line communication device and a smart grid wireless device, converting the packet by the device to comply with a destination of the packet, wherein the conversion employs only MAC address for addressing;

sending the converted packet to the destination, obtaining a power line communication MAC address for a smart grid wireless device newly discovered in the local area network;

updating the table by adding a smart grid wireless MAC address of the discovered smart grid wireless device in association with the obtained power line communication MAC address in the table; and announcing over the power lines that a new power line communication device having the obtained power line communication MAC address has joined a power line communication network in the local area network.

17. A method, comprising:

receiving a packet at a system connected to power lines in a network;

detecting, by a device, addressing information of the packet;

in case the packet belongs to communication between a power line communication device and a smart grid wireless device, converting the packet by the device to comply with a destination of the packet, wherein the conversion employs only MAC address for addressing;

sending the converted packet to the destination, obtaining a smart grid wireless MAC address for a power line communication device newly discovered in the local area network;

updating the table by adding a power line communication MAC address of the discovered power line communication device in association with the obtained smart grid wireless MAC address in the table;

announcing wirelessly that a new smart grid wireless device having the obtained smart grid wireless MAC address has joined a smart grid wireless network in the local area network.

\* \* \* \* \*